United States Patent
Mues et al.

(10) Patent No.: US 11,544,028 B2
(45) Date of Patent: Jan. 3, 2023

(54) DISTRIBUTED SYSTEM FOR DISPLAYING A CONTENT

(71) Applicant: APTIV TECHNOLOGIES LIMITED, St. Michael (BB)

(72) Inventors: Pascal Mues, Osterode am Harz (DE); Olaf Donner, Harsum (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 289 days.

(21) Appl. No.: 16/798,519

(22) Filed: Feb. 24, 2020

(65) Prior Publication Data

US 2020/0326898 A1 Oct. 15, 2020

(30) Foreign Application Priority Data

Apr. 12, 2019 (EP) ..................................... 19169109

(51) Int. Cl.
G06F 9/455 (2018.01)
G06F 3/14 (2006.01)
H04L 12/44 (2006.01)
H04L 67/10 (2022.01)

(52) U.S. Cl.
CPC .......... *G06F 3/1446* (2013.01); *G06F 9/4555* (2013.01); *H04L 12/44* (2013.01); *H04L 67/10* (2013.01)

(58) Field of Classification Search
CPC .............................. G06F 3/1446; G06F 9/4555
See application file for complete search history.

(56) References Cited

U.S. PATENT DOCUMENTS

| | | | |
|---|---|---|---|
| 2012/0105637 A1* | 5/2012 | Yousefi | H04W 72/10 348/148 |
| 2015/0254048 A1 | 9/2015 | Morton et al. | |
| 2016/0246560 A1 | 8/2016 | Petrov | |
| 2016/0328272 A1* | 11/2016 | Ahmed | G06F 9/4881 |

OTHER PUBLICATIONS

Bedir Tekinerdogan; Software Architecture; Nov. 28, 2016; Springer; (Year: 2016).*
Tobias Hostein; Contradiction of Separation through Virtualization and Inter Virtual Machine Communication in Automotive Scenarios; ACM; (Year: 2015).*
Extended European Search Report for Application No. EP 19 16 9109 dated Sep. 27, 2019.

* cited by examiner

*Primary Examiner* — Dong U Kim
(74) *Attorney, Agent, or Firm* — Carlson, Gaskey & Olds, P.C.

(57) ABSTRACT

A current display system comprises a plurality of computer blades, interconnected with each other and each hosting a graphics processor and a plurality of virtualized operating systems (OS) run by an hypervisor and sharing said graphics processor. Each computer blade is connected directly to a set of display devices including a part of a plurality of display devices. All computer blades are connected to all the display devices. Each virtualized OS runs a global compositor instance and at least one application. The global compositor instance of a first virtualized OS transmits a graphical output to a display device driven by a second virtualized OS, via the global compositor instance of said second virtualized OS, so that an application content from an application run by said first virtualized OS is displayed on said second display device.

16 Claims, 1 Drawing Sheet

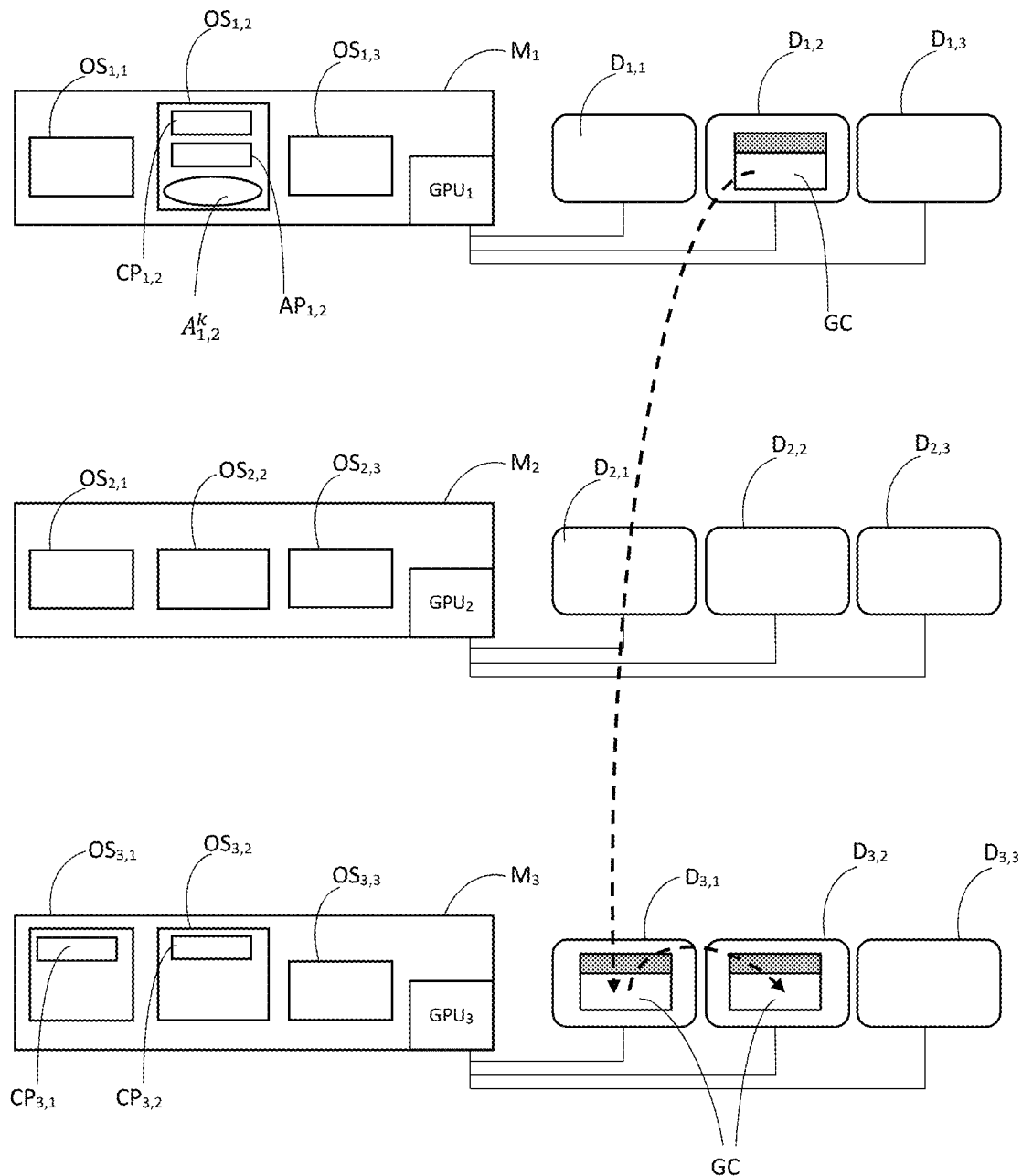

DISTRIBUTED SYSTEM FOR DISPLAYING A CONTENT

CROSS REFERENCE TO RELATED APPLICATION

This application claims priority to European Patent Application No. 19 169 109.6, filed on Apr. 12, 2019.

TECHNICAL FIELD

The present disclosure relates to the field of displaying a content in a distributed system having a plurality of display devices. Such a system can be used for example in a vehicle hosting several displays.

BACKGROUND

With the development of distributed systems, it may be needed to distribute a graphical content to different places to be displayed. This requires important graphical rendering resources, such as graphical processors. Usually, a compositor, such as Weston© or X-Server©, manages a Graphics Processing Unit, or GPU, controlled by a Central Processing Unit, or CPU, and the graphical content is used locally on the CPU.

An object of the present disclosure is to improve the situation. More precisely, an object of the disclosure is to provide a system for distributing a content to different display devices to be displayed, without requiring important rendering resources.

SUMMARY

The present disclosure concerns a distributed system for displaying a content comprising a plurality of computer blades interconnected with each other. Each computer blade hosts a graphics processor and a plurality of virtualized operating systems run by a hypervisor and sharing said graphics processor. Each computer blade being connected directly to a set of display devices including a part of a plurality of display devices. All computer blades are connected to all the display devices. Each virtualized operating system runs a global compositor instance and at least one application. The global compositor instance of a first virtualized operating system transmits a graphical output to a display device driven by a second virtualized operating system, via the global compositor instance of said second virtualized operating system, so that an application content from an application run by said first virtualized operating system is displayed on said second display device.

The computer blades are computing modules that are hardware and independent physical components.

The plurality of global compositor instances run by the plurality of virtualized operating systems form a distributed global compositor application. The global compositor instances act as a network to exchange information and share a content on a low level. One global compositor instance may request an action from another global compositor instance.

Advantageously, each virtualized operating system runs an application proxy instance as an intermediary between the at least one application and the global compositor instance of said virtualized operating system. Thus, the system includes, in each virtualized operating system, two separate components that are a global compositor instance and an application proxy instance. Such a configuration allows to separate the composition from the creation of a graphical content. Screens can be shared with minimal impact on the software that produces the content. For example, a user may start an Android™ software application on one of the computer blades and render an application content, looking like an Android™ phone screen, on a display device driven by said computer blade. It could also render the application content on another display device, for example a display device of a rear seat entertainment system of a car, as if it was a dedicated Android™ reas seat entertainment system. Android™ would not be aware that anything is special with the environment. But the application proxy instance would announce the Android™ screen with parameters and identifier. Any other virtualized operating system, that runs the global compositor instance, can grab the screen and display it somewhere else.

Advantageously, the global compositor instance of said second virtualized operating system forwards the graphical output to the global compositor instance of a third virtualized operating system so that the application content is displayed on a third display device driven by said third virtualized operating system.

The first virtualized operating system and the second virtualized operating system may be hosted by two different computer blades or by the same computer blade.

The second virtualized operating system and the third virtualized operating system may be hosted by two different computer blades or by the same computer blade.

The computer blades are interconnected to each other through a peripheral component providing a star connection or by direct links.

A second aspect of the disclosure concerns a vehicle integrating the distributed system for displaying a content as defined above.

BRIEF DESCRIPTION OF THE DRAWINGS

Other features, purposes and advantages of the disclosure will become more explicit by means of reading the detailed statement of the non-restrictive embodiments made with reference to the accompanying drawing.

FIG. 1 shows a distributed system for displaying application contents on different display devices, according to an exemplar embodiment.

DETAILED DESCRIPTION

FIG. 1 shows a distributed system 100 for displaying content, according to an exemplary embodiment. For example, the system 100 may be integrated in a vehicle.

Displayed content may be any digital material including information that can be displayed, such as video, images, text, web pages, digital books or magazines, games, social media, news, television, etc.

The system 100 includes a plurality of computing modules or computer blades, referenced as $M_i$, where i represents a computing module index with $1 \leq i \leq N$, and where N is the total number of computing modules in system 100. In the exemplary embodiment shown in FIG. 1, the system 100 comprises three computing modules $M_1$, $M_2$ and $M_3$.

Each computer blade or computing module $M_i$ is a hardware component and an independent (separate) physical component. For example, each computing module comprises a dedicated SoC ("System on a Chip"). The different computing modules are interconnected to each other, preferably via a high-speed transmission channel (not represented). The interconnection can be performed by a peripheral component providing a star connection, such as a backbone including a PCIe switch, or by direct individual connections or links.

The system 100 further comprises a plurality of display devices. For example, in the case of a vehicle, the system 100 may include a dashboard display device, different passenger display devices (e.g. a front seat display device and/or a right rear seat display device and/or a left rear seat display device) and possibly a display device located in the car trunk.

Each computing module $M_i$ is directly connected to a set of display devices $D_{i,j}$ (one or more display devices) that includes a part of the plurality of display devices, through a physical or wireless connection, and configured to drive said set of display devices $D_{i,j}$ (j representing an index of a display device directly connected to the computing module $M_i$, with $1 \leq j \leq X_i$, where $X_i$ is the total number of display devices directly connected to the computing module $M_i$). In other words, each computing module $M_i$ is directly connected to and configured to drive some of the display devices $D_{i,j}$ (with $1 \leq j \leq X_i$). Globally, all computing modules $M_i$ are connected to all display devices $D_{i,j}$, with $1 \leq i \leq N$ and $1 \leq j \leq X_i$.

Each computing module $M_i$ comprises computer hardware and software resources.

The hardware resources of computing module $M_i$ include a dedicated graphics processor, or GPU (Graphics Processing Unit), referenced as $GPU_i$. Advantageously, each computing module $M_i$ comprises only one graphics processor $GPU_i$.

The software resources of each computing module $M_i$ include a host operating system and one or more virtualized operating systems. Each virtualized operating system is configured to drive at least one display device directly connected to the computing module $M_i$. In the present embodiment, one virtualized operating system $OS_{i,j}$ is configured to drive one display device $D_{i,j}$ (with $1 \leq j \leq X_i$, $X_i$ being the total number of virtualized operating systems and the total number of display devices). The virtualized operating systems $OS_{i,j}$ of each computing module $M_i$ are configured to share and manage the common hardware resources of said computing module $M_i$. In particular, the graphics processor $GPU_i$ of computing module $M_i$ is shared by the different virtualized operating systems $OS_{i,j}$ hosted by computing module $M_i$. Each computing module $M_i$ also comprises a software hypervisor (not represented) configured to run in parallel the plurality of virtualized operating system $OS_{i,j}$.

Each virtualized operating system $OS_{i,j}$ is configured to manage and run a dedicated software global compositor instance $CP_{i,j}$ one or more software applications $A_{i,j}^k$ (or application programs), k representing an application index, and a dedicated software application proxy instance $AP_{i,j}$ as an intermediary between said applications $A_{i,j}^k$ and the global compositor instance $CP_{i,j}$.

A global compositor instance is an instance of a software global compositor, such as Weston or X-server, and has the function of composing a graphical output suitable to be processed and displayed by a display device, for example upon request of a software application for displaying an application content. The software global compositor is on the host operating system. In the system 100, any display device $D_{i,j}$ has a global compositor instance assigned. The global compositor instance comprises a window manager configured to manage where and how the different program windows should be drawn on a screen of a display device. The information about the surfaces of windows to be drawn are obtained by the global compositor instances from the application proxy instances. A global compositor instance is runtime specific and bound to a computing module.

With such a configuration, the system 100 has a distributed software global compositor provided by a plurality of software global compositor instances $CP_{i,j}$ managed by a plurality of virtualized operating systems $OS_{i,j}$ hosted by different computing modules $M_i$. The plurality of global compositor instances $CP_{i,j}$ act as a network that can exchange information about graphical contents they can provide for the network and share the graphical contents on a low level (i.e., as graphical outputs suitable to be processed and displayed by a display device).

Each application proxy instance $AP_{i,j}$ acts as an intermediary for requests from the software applications $A_{i,j}^k$ of the virtualized operating system $OS_{i,j}$ seeking resources to display application contents from the dedicated global compositor instances $CP_{i,j}$ of the virtualized operating system $OS_{i,j}$ and additionally or alternatively from global compositor instances of virtualized operating systems other than $OS_{i,j}$.

The application proxy instance $AP_{i,j}$ resides inside the virtualized operating system $OS_{i,j}$. The graphical contents reside inside the host operating system. The application proxy instance $AP_{i,j}$ provides an interface in the virtualized operating system $OS_{i,j}$ towards the applications $A_{i,j}^k$ inside the virtualized operating system $OS_{i,j}$. The application proxy instance $AP_{i,j}$ provides the availability of applications from the virtualized OS to the global compositor on the host operating system. On the way back, the global compositor sends back for touch input from a touch screen from the host operating system towards the application proxy instance $AP_{i,j}$ on the virtualized operating system $OS_{i,j}$, in case the application surface gets touch on the display.

The application proxy instance provides an interface between one or more software applications that create an original or native graphical content and the related global compositor instance, inside a virtualized operating system. It is configured to send information about the graphical content that is provided by the virtualized OS and surface(s) for rendering the content to the related global compositor instance. The global compositor instance may decide to draw the virtualized surface(s) on another display device (other than the display device driven by the related virtualized operating system), for example upon a request from another global compositor instance to receive the graphical content or under control of the global HMI system, and request the application proxy instance to put the naked surface into a transport layer (e.g., a shared RAM or any other transport means). Thus, the application proxy instance would forward the surface control information (size info, color mapping details, etc.) to the requesting global compositor instance.

The global compositor instance $CP_{i,j}$ of a first virtualized operating system $OS_{i,j}$ is configured to transmit a graphical output to a first display device $D_{i,j}$ driven by said first virtualized operating system $OS_{i,j}$ in order to display an application content upon request of an application $A_{i,j}^k$ of said first virtualized operating system $OS_{i,j}$.

The global compositor instance $CP_{i,j}$ of said first virtualized operating system $OS_{i,j}$ is also configured to transmit the graphical output to a second display device $D_{i',j'}$ (other than the first display device $D_{i,j}$), driven by a second virtualized operating system $OS_{i',j'}$ (other than the first virtualized operating system $OS_{i,j}$), via the global compositor instance $CP_{i',j'}$ of said second virtualized operating system $OS_{i',j'}$, so that the application content from the application $A_{i,j}^k$ run by the first virtualized operating system $OS_{i,j}$ can be displayed by said second display device $D_{i',j'}$ of system 100. The first and second virtualized operating systems may be hosted in the same computing module or in two different computing modules. In other words, the graphical output from the first virtualized operating system $OS_{i,j}$ is sent to the display device $D_{i,j}$ driven by the first virtualized operating system $OS_{i,j}$ and, additionally or alternatively, to a second display device driven by a second virtualized operating system (other than the first $OS_{i,j}$). To this end, the global compositor instance $CP_{i,j}$ of the first virtualized operating system $OS_{i,j}$ communicate with the global compositor instance of said second virtualized operating system and transmit the graphical output to the global compositor instance of said second virtualized operating system. Thus, an application running in a first virtualized operating system can present a graphical output to a display device driven by a second virtualized operating system, via the global compositor instances of the first and second virtualized operating systems, said first and second virtualized operating system being hosted by the same computing module or by two different computing modules of system 100. The global compositor instance of the first virtualized operating system may also send the graphical output to a plurality of second display devices driven by a plurality of second virtualized operating systems (other the first virtualized operating system), in order to display the application content on several display devices.

In a particular embodiment, each virtualized operating system has one assigned display device and is configured to show its graphical content on said assigned display device. However, a user might decide to move a content (a full screen content or just a single application content) to another display device. Let's take the example of a right rear seat entertainment system and a left rear seat entertainment system, respectively provided with a right rear seat display device and a left rear seat display device. In this example, the right rear seat entertainment system has a LG WebOS operating system that is a Linux kernel-based multitasking operating system for smart devices such as smart TVs. A right sitting user of the right display device would normally use the LG WebOS operating system to watch a video or a TV program on the right display device. The left rear seat entertainment system might have an Android™ operating system. A left sitting user of the left display device would normally use the Android operating system to watch a content on the left display device. At any time, with some interaction with the HMI system, the left sitting user can copy a content, such as a film, rendered on the left display device to the right display device.

In another embodiment, the global compositor instance $CP_{i',j'}$ of the second virtualized operating system $OS_{i',j'}$, that receives the graphical output from the global compositor instance $CP_{i,j}$ of the first virtualized operating system, forwards the graphical output to the global compositor instance $CP_{i'',j''}$ of a third virtualized operating system $OS_{i'',j''}$, in order to control displaying the application content on a third display device $D_{i'',j''}$ driven by said third virtualized operating system $OS_{i'',j''}$. Thus, the application content from an application $A_{i,j}^k$ of the first virtualized operating system $OS_{i,j}$ can additionally or alternatively be displayed on said third display device $D_{i'',j''}$. The second and third virtualized operating systems may be hosted in the same computing module or in two different computing modules.

The global compositor instance of a virtualized operating system has access to the graphical surfaces or full screens that the related virtualized operating system produced and can control to move such surface or screen into another composition of graphical output sent to any of the display devices.

A global HMI system (not represented) is configured to control displaying an application content and instruct on which display device(s) the application content should be displayed. The global HMI system is either centralized or distributed.

FIG. 1 illustrates a use case wherein a content application is displayed on three display devices of a system 100 including three computing module $M_1$, $M_2$ and $M_3$, that each includes three virtualized operating system $\{OS_{1,1}, OS_{1,2}, OS_{1,3}\}$, $\{OS_{2,1}, OS_{2,2}, OS_{2,3}\}$ and $\{OS_{3,1}, OS_{3,2}, OS_{3,3}\}$ configured to drive three respective display devices $\{D_{1,1}, D_{1,2}, D_{1,3}\}$, $\{D_{2,1}, D_{2,2}, D_{2,3}\}$ and $\{D_{1,1}, D_{3,2}, D_{3,3}\}$. More precisely, according to this use case, an application $A_{1,2}^k$ of virtualized operating system $OS_{1,2}$ of computing module $M_1$ requests displaying a graphical content GC (that is an application content created by application $A_{1,2}^k$). According to a rule defined by the global HMI system, the graphical content GC should be displayed by display device $D_{1,2}$ driven by virtualized operating system $OS_{1,2}$ and by two other display devices, here $D_3,1$ and $D3,2$, driven by two other virtualized operating system $OS3,1$ and $OS3,2$.

The HMI system sends to the global compositor (on the host operating system) an information related to a position and size on the display for an application $A_{1,2}^k$. The application on the virtualized operating system requests a rendering surface from the application proxy instance. This surface is shared towards the global compositor on the host operating system. The global compositor takes the rendering surface as it is provided from the application proxy instance.

The global compositor instance $CP_{1,2}$ produces a graphical output suitable to be processed and displayed by a display device and also copies and transmits the graphical output to the display device $D_{1,2}$ driven by the virtualized operating system $OS_{1,2}$. In addition, under control of the HMI system, the global compositor instance $CP_{1,2}$ transmits the graphical output to the global compositor instance $CP_{3,1}$ of virtualized operating $OS_{3,1}$. A memory mapping is done between the host operating system and the virtualized operating system. The global compositor instance $CP_{3,1}$ controls the graphical output to display device $D_{3,1}$, in order to display the graphical content on said display device $D_{3,1}$. In addition, the global compositor instance $CP_{3,1}$ forwards the graphical output to the global compositor instance $CP_{3,2}$ of the virtualized operating system $OS_{3,2}$. Then, the global compositor instance $CP_{3,2}$ controls the graphical output to the display device $D_{3,2}$ driven by the virtualized operating system $OS_{3,2}$ to display the graphical content GC on display device $D_{3,2}$. Thus, the graphical content GC is displayed on the three display devices $D_{1,2}$, $D_{3,1}$ and $D_{3,2}$.

For example, the content to be displayed may be an image from a camera based rear mirror. This content may be displayed on a dashboard display device at any time, under command of a user. When rear drive is activated by a driver, the same content can be automatically transferred to one or more other display devices (other than the dashboard display device), under control of the HMI system. Thus, the reaction to the rear gear engagement would be a global HMI control.

The present disclosure may use a non-transitory computer readable medium comprising program instructions for causing the distributed system 100 to perform at least the following: running, by each virtualized operating system, a global compositor instance $CP_{i,j}$ and at least one application $A_{i,j}^k$ and transmitting, by the global compositor instance $CP_{i,j}$ of a first virtualized operating system $OS_{i,j}$, a graphical output to a display device $D_{i',j'}$ driven by a second virtualized operating system $OS_{i',j'}$, via the global compositor instance $CP_{i',j'}$ of said second virtualized operating system $OS_{i',j'}$, so that an application content from an application $A_{i,j}^k$ run by said first virtualized operating system $OS_{i,j}$ is displayed on said second display device $D_{i',j'}$.

As previously described, the distributed system 100 comprises a plurality of computer blades $M_i$, interconnected with each other, each computer blade
hosting a graphics processor $GPU_i$ and a plurality of virtualized operating systems $OS_{i,j}$ run by an hypervisor and sharing said graphics processor, and
a plurality of display devices $D_{i,j}$, each computer blade $M_i$ being connected directly to a set of display devices including a part of the plurality of display devices, all computer blades being connected to all the display devices.

The non-transitory computer readable medium may comprise other program instructions for causing the distributed system 100 to perform the operations as described in the present description.

The invention claimed is:

1. A distributed system for displaying content, the system comprising:
   a plurality of computer blades, interconnected with each other, each computer blade hosting a plurality of virtualized operating systems and a graphics processor; and
   a plurality of display devices,
   wherein
   each computer blade is coupled to a different subset of the plurality of display devices;
   each virtualized operating system is configured to run at least one application and a global compositor instance bound to a specific run time corresponding to each of the plurality of computer blades associated with the different subset of the plurality of display devices;
   a first one of the plurality of computer blades hosting a first one of the virtualized operating systems that is configured to run a first global compositor instance and drive a first display device of a first subset of the plurality of display devices that is coupled to the first one of the plurality of computer blades;
   a second one of the plurality of computer blades hosting a second one of the virtualized operating systems that is configured to run a second global compositor instance and drive a second display device of a second subset of the plurality of display devices that is coupled to the second one of the plurality of computer blades; and
   the first global compositor instance transmits a graphical output to the second display device driven by the second one of the virtualized operating systems, via the second global compositor instance, so that application content from an application run by said first virtualized operating system is displayed on said second display device.

2. The distributed system according to claim 1, wherein each virtualized operating system runs an application proxy instance as an intermediary between the at least one application and the global compositor instance of said virtualized operating system.

3. The distributed system according to claim 1, wherein the second global compositor instance forwards the graphical output to a third global compositor instance of a third virtualized operating system so that the application content is displayed on a third display device driven by said third virtualized operating system.

4. The system according to claim 3, wherein the second virtualized operating system and the third virtualized operating system are hosted by two different computer blades.

5. The system according to claim 3, wherein the second virtualized operating system and the third virtualized operating system are hosted by the same computer blade.

6. The system according to claim 1, wherein the computer blades are interconnected to each other through a peripheral component.

7. The system according to claim 1, wherein the computer blades are interconnected to each other by direct links.

8. A vehicle comprising the system according to claim 1.

9. A system for displaying content, the system comprising:
   a plurality of computer devices, interconnected with each other, each computer device hosting a plurality of virtualized operating systems and a graphics processor, each virtualized operating system being configured to run at least one application and a global compositor instance bound to a specific run time corresponding to each of the plurality of computer blades associated with the different subset of the plurality of display devices; and
   a plurality of display devices,
   wherein
   each computer device is coupled to a different subset of the plurality of display devices,
   a first one of the plurality of computer devices hosting a first one of the virtualized operating systems that is configured to run a first global compositor instance and to drive a first display device of a first subset of the plurality of display devices connected to the first one of the plurality of computer devices
   a second one of the plurality of computer devices hosting a second one of the virtualized operating systems that is configured to run a second global compositor instance and to drive a second display device of a second subset of the plurality of display devices connected to the second computer device,
   the first global compositor instance transmits a graphical output to the second display device, via the second global compositor instance, so that application content from an application run by the first one of the virtualized operating systems is displayed on the second display device.

10. The system according to claim 9, wherein each virtualized operating system runs an application proxy instance as an intermediary between the at least one application and the global compositor instance of said virtualized operating system.

11. The system according to claim 9, wherein the second global compositor instance forwards the graphical output to a third global compositor instance run by a third one of the virtualized operating systems so that the application content is displayed on a third display device driven by said third one of the virtualized operating systems.

12. The system according to claim 11, wherein the second one of the virtualized operating systems and the third one of the virtualized operating systems are hosted by two different computer devices.

13. The system according to claim 11, wherein the second one of the virtualized operating systems and the third one of the virtualized operating systems are hosted by the same computer device.

14. The system of claim 9, wherein the global compositor instances hosted by different ones of the computer devices establish a network configured for exchanging information about graphical content to be displayed on at least a selected one of the plurality of display devices.

15. The system of claim 9, wherein each computer device is a separate physical hardware component.

16. A non-transitory computer readable medium comprising program instructions for causing a distributed system for displaying content, said system comprising:
- a plurality of computer devices, interconnected with each other, each computer device hosting a plurality of virtualized operating systems and a graphics processor, each virtualized operating system being configured to run at least one application and a global compositor instance bound to a specific run time corresponding to each of the plurality of computer blades associated with the different subset of the plurality of display devices; and
- a plurality of display devices, wherein
- each computer device is coupled to a different subset of the plurality of display devices,
- a first one of the plurality of computer devices hosts a first one of the virtualized operating systems that is configured to run a first global compositor instance and to drive a first display device of a first subset of the plurality of display devices connected to the first one of the plurality of computer devices
- a second one of the plurality of computer devices hosts a second one of the virtualized operating systems that is configured to run a second global compositor instance and to drive a second display device of a second subset of the plurality of display devices connected to the second computer device, the instructions causing the distributed system to perform at least the following:
- running, by each virtualized operating system, a global compositor instance and at least one application and
- transmitting, by the first global compositor instance, a graphical output to the second display device driven by the second virtualized operating system, via the second global compositor instance, so that application content from an application run by said first virtualized operating system is displayed on said second display device.

* * * * *